April 29, 1952 M. R. DILLING 2,594,744

OPTICAL COMPARING UNIT

Filed June 1, 1950 3 Sheets-Sheet 1

INVENTOR
MARION R. DILLING
BY William Lang
ATTORNEY

April 29, 1952

M. R. DILLING 2,594,744

OPTICAL COMPARING UNIT

Filed June 1, 1950

3 Sheets-Sheet 2

INVENTOR
MARION R. DILLING
BY William Lang
ATTORNEY

April 29, 1952 M. R. DILLING 2,594,744

OPTICAL COMPARING UNIT

Filed June 1, 1950 3 Sheets-Sheet 3

INVENTOR
MARION R. DILLING
BY William Lang
ATTORNEY

Patented Apr. 29, 1952 2,594,744

UNITED STATES PATENT OFFICE 2,594,744

OPTICAL COMPARING UNIT

Marion R. Dilling, Hastings-on-Hudson, N. Y., assignor to International Business Machines Corporation, New York, N. Y., a corporation of New York Application June 1, 1950, Serial No. 165,567

5 Claims. (Cl. 250—220)

This invention relates to machines for merging groups of tabulating cards. French Patent No. 833,975 filed December 31, 1937, United States Patent No. 2,359,670, granted October 3, 1944, and corresponding British Patent No. 523,652, accepted July 19, 1940, show a machine of this type in which two comparing units called in the patent "primary and secondary comparing units" are found. The construction of these units is such that they each constitute an analyzing mechanism capable of comparing between them the numbers represented by perforations in the tabulating cards.

These comparing units detect an equal, a high, or a low condition between two numbers and operate electrical contacts to actuate relays and cause various functions to be performed by the collator. In the present embodiment, the comparing unit is disposed in a collator of the type described in the above mentioned French, United States and British Patents No. 833,975, 2,359,670 and 523,652 respectively.

The principal object of the present invention is to provide an improved comparing unit which eliminates the use of the electrical contacts and utilizes an optical system combined with three light responsive devices and the necessary amplifying equipment to provide impulses to actuate relays or cause any desired result in the collator.

A further object of the invention is to provide a comparing unit which eliminates the loss of mechanical efficiency due to moving electrical contact parts.

Another object of the invention is to minimize the cost of replacement and repair of the comparing unit by eliminating the moving electrical contact parts.

Other objects of the invention will be pointed out in the following description and claims and illustrated in the accompanying drawings, which disclose, by way of examples, the principle of the invention and the best mode, which has been contemplated, of applying that principle.

A collating operation is based upon the principle of comparing two numbers and determining whether they are equal or unequal. If the numbers are unequal, then it must be determined which is the lower of the two. This comparison is accomplished in the collator automatically by differential sensing units.

To accomplish this comparison it is necessary to have a mechanism which will accept readings from two sources and will operate so that a reading from either one or both sources may effect a change from the normal position.

In describing the invention only one element of the comparing unit will be considered in detail, however, it should be noted that the comparing unit of a collator comprises a plurality of such elements mounted side by side to a common support rod.

Figures 1, 7:
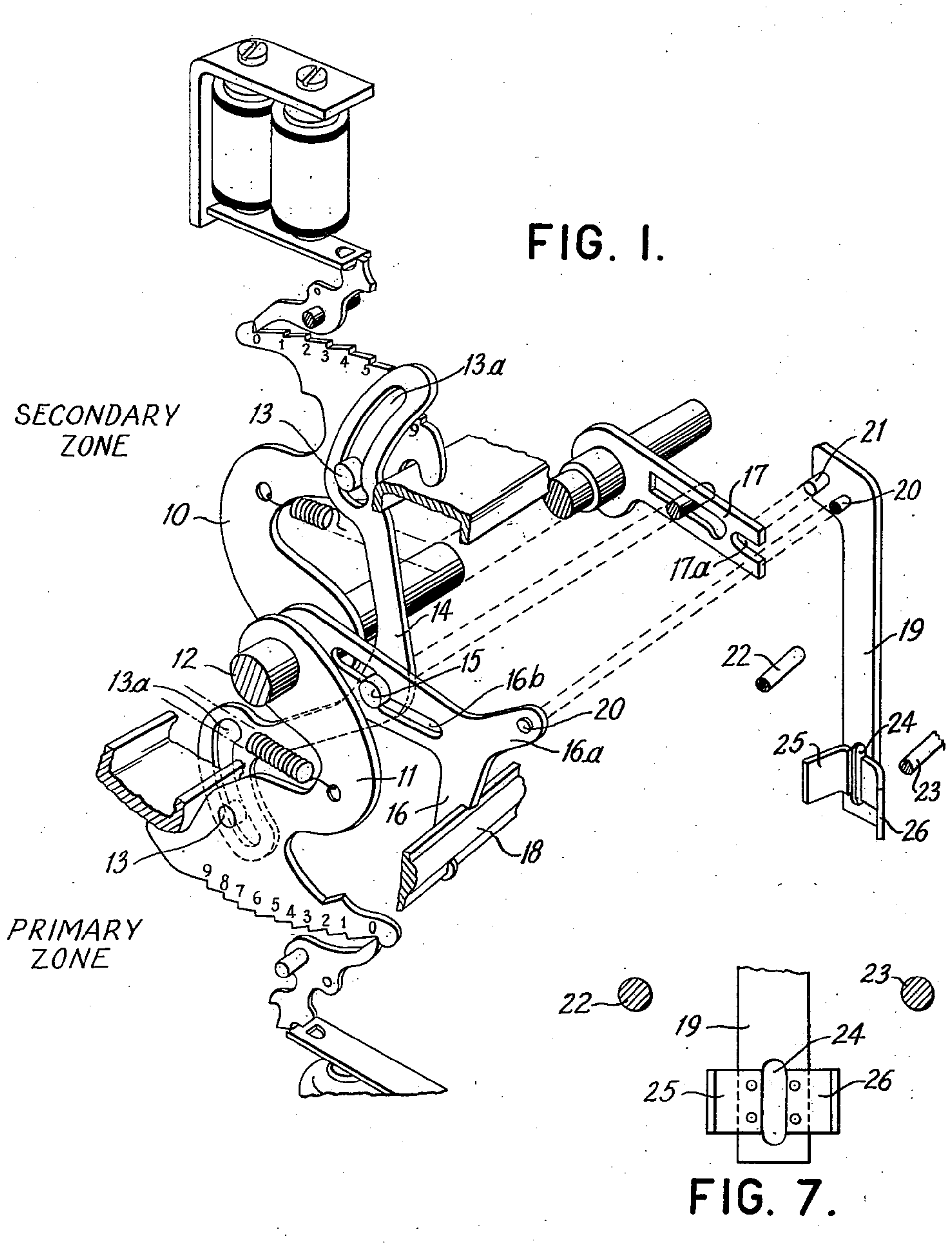
Fig. 1 is a perspective view of one element of the comparing unit showing the position of the operating arm for a normal setting on the sectors.
Fig. 7 is a detail view of the lower portion of the operating arm showing the reflectors fastened thereto.
Figures 2, 3:
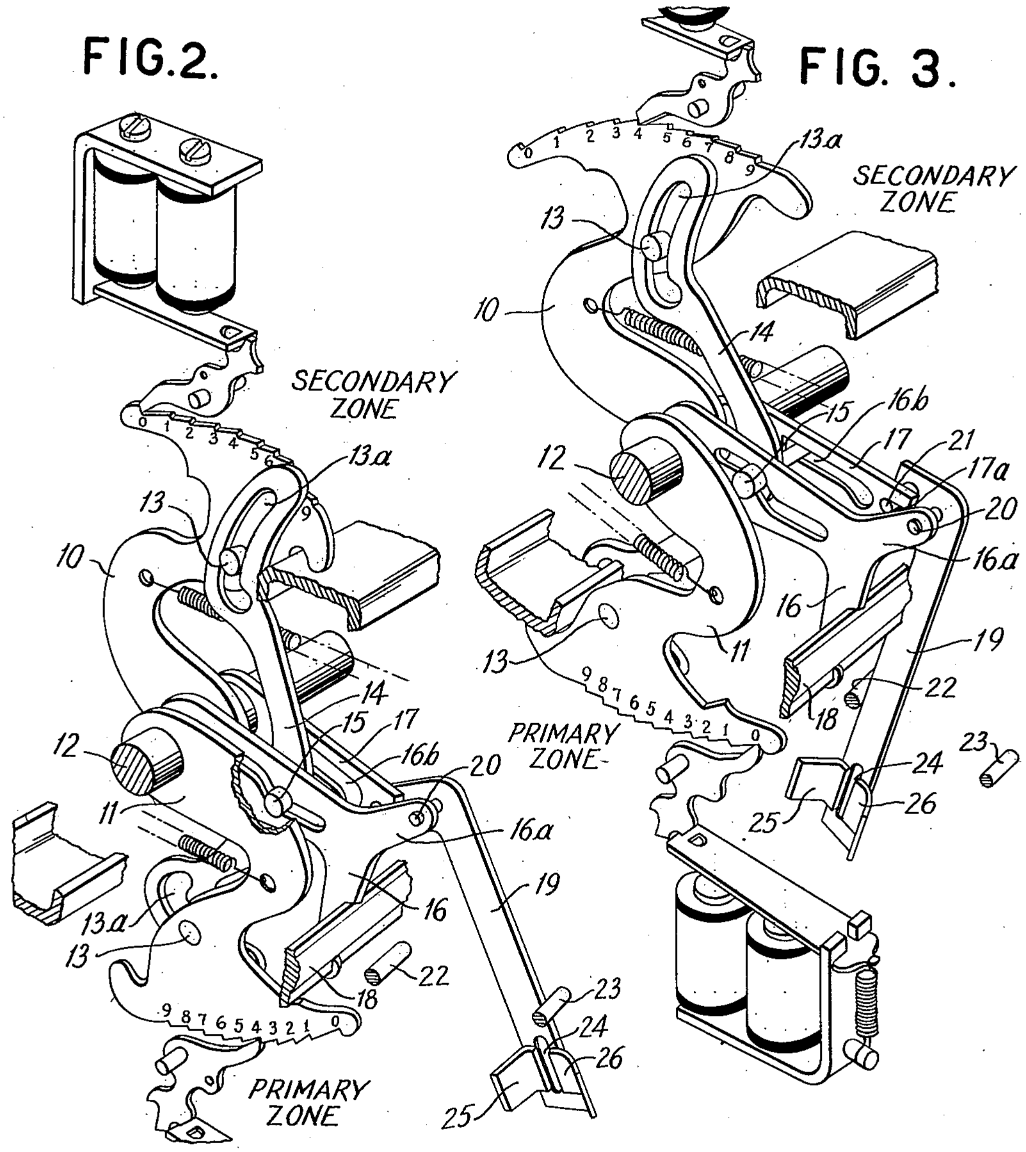
Figs. 2 and 3 are similar views to Fig. 1 showing the position of the operating arm for unequal settings on the sectors.

Referring to Figs. 1, 2 and 3 of the drawings, each of the elements of the comparing unit comprises two setup ratchets or sectors designated 10 and 11 rotatably mounted on a rod 12 which extends between the side plates of the collator. Both sectors 10 and 11 are provided with pins 13 located equal distances from rod 12 and having circumferential grooves riding in curved slots 13a formed in a differential link 14. Said link has a pin 15 which extends through, and projects from both of its sides. The front end or head of pin 15 is provided with a circumferential groove embracing a cam slot 16b formed in a stationary guide plate 16 while the shank of the pin acts as a rivet to secure a grooved collar to the rear side of differential link 14. The grooved collar is of substantially the same dimensions as the head of the pin and the groove in the collar embraces a straight slot formed in a comparison member or control arm 17.

Guide plate 16 is pivotally mounted at one end to rod 12 and also has a shallow rectangular slot at the other end embracing a support bar 18 secured to the side plates of the collator.

The guide slot in plate 16 has two long straight portions, angularly displaced with reference to rod 12 and substantially radial of rod 12, and also a relatively short straight portion connecting the longer portions but making a rather sharp angle to a line passing through the center of rod 12.

Control arm 17 is rotatably mounted on rod 12 at one end, the opposite end being free to move about the rod as a center, and the slot therein is straight and extends radially of said rod. The curved slots 13a in link 14 are so designed that when sectors 10 and 11 are both moved equal distances, as would be the case when both holes in a given column of two cards have the same numerical value, both ends of the link will receive equal and opposite angular displacements and consequently pin 15 will remain stationary so far as movement radially of rod 12 is concerned. On the other hand, if a hole in a given column of the secondary card, for example, is lower in value than the hole in the same column of the primary card as represented by the setting of upper and lower sectors 10 and 11 respectively, the sector 10 will move clockwise a greater extent than the sector 11 moves counterclockwise. As a result the upper end of link 14 will be moved farther to the right than the lower end is moved to the left, causing pin 15 to move to the right.

When both sectors 10 and 11 are at either of their limits of travel or in positions having the same value, the pin 15 will be located at the center of the short connecting portion of the slot in guide plate 16 thus holding control arm 17 in a neutral position. When pin 15 is caused to move to the right, it enters the right hand straight portion of the slot 16b in guide plate 16 causing control arm 17, connected to link 14 by the aforementioned grooved collar, to be rocked clockwise. On the other hand, when the numerical relation of the holes is reversed as illustrated in Fig. 3 and pin 15 moves to the left from the neutral position, pin 15 enters the left hand straight portion of the slot in guide plate 16, camming the connected control arm 17 in a counterclockwise direction.

The foregoing briefly describes the well known comparing operation as is more specifically set forth in the patents referred to. In summary, the mechanism controls the arm 17 to take one of three angular positions with respect to rod 12. These are, a central position as in Fig. 1 when the two settings are alike; a clockwise position as in Fig. 2 when the upper setting is lower in value than the lower setting; and a counterclockwise position as in Fig. 3 when the upper setting is greater in value than the lower setting.

In accordance with the present invention the control arms 17 operate an optical system combined with three light responsive devices and the necessary amplifying equipment to provide impulses to actuate relays or cause any desired result in the collating machine.

For each arm 17 there is an operating arm 19 pivotally mounted at 20 to an extension 16a of guide plate 16. Operating arm 19 carries a pin 21 which is seated in a slot 17a formed on the free end of control arm 17 as shown in Fig. 1. When control arm 17 is rocked in a clockwise direction arm 17 forces pin 21 downwardly causing operating arm 19 to move counterclockwise about pivot point 20 (Fig. 2). If control arm 17 is rocked counterclockwise, arm 17 forces pin 21 upwardly causing the operating arm to move clockwise about pivot point 20 (Fig. 3). Stops 22 and 23 are disposed on each side of arm 19 to limit its swing. Each operating arm 19 has an opening 24 located a short distance from its lower end. Reflectors 25 and 26 are attached to arm 19 on each side of opening 24 at suitable angles to reflect a light ray to a corresponding light responsive device when in operating position. Any suitable reflecting device such as a mirror or prism may be used as a reflecting surface.

Figure 4:
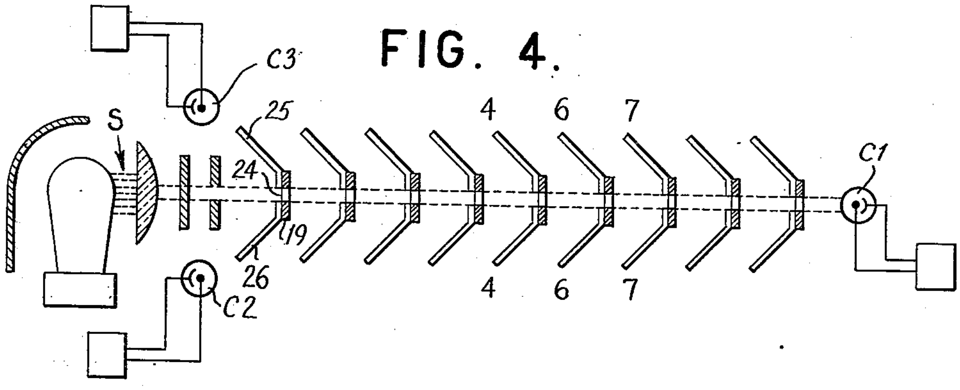
Fig. 4 is a diagram showing the position taken by the operating arms for an equal setting on the sectors in all denominational orders.

Referring now to Fig. 4, the source of light is derived from an optical system S providing a one-eighth inch parallel light beam. When the operating arms 19 of all the elements are in alignment as a result of an equal setting on the sectors 10 and 11 of each element, the light passes through opening 24 of each successive arm without being deflected by the reflectors 25 or 26 and energizes a light responsive device shown for purposes of this invention as a photo-electric cell C1 positioned after the opening of the last arm.

Figure 5:
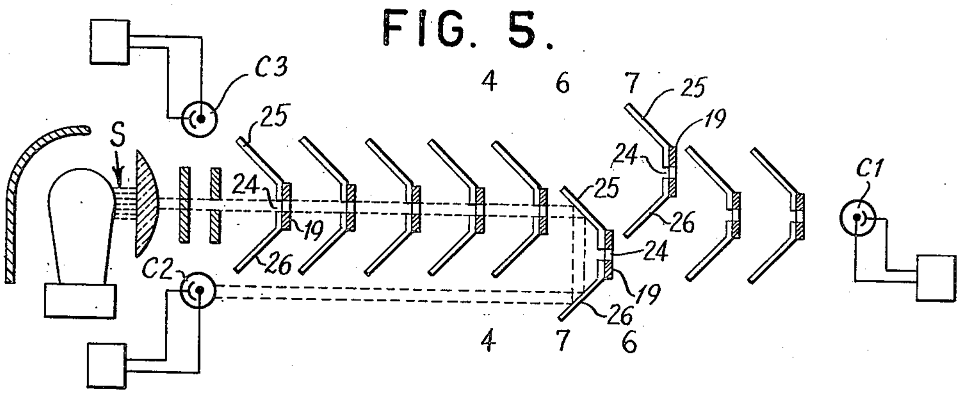
Figs. 5 and 6 are diagrams showing the positions taken by the operating arms for unequal settings on the sectors of various denominational orders.

When one of the series of operating arms 19 is rocked counterclockwise about its pivot 20 (as in Fig. 2) in response to an unequal setting of sectors 10 and 11, or downward as indicated in Fig. 5, reflector 25 is moved into the path of the light ray and reflects the beam to reflector 26 which is in angular adjustment with respect to reflector 25 to reflect the light ray back to a photo-electric cell C2.

Figure 6:
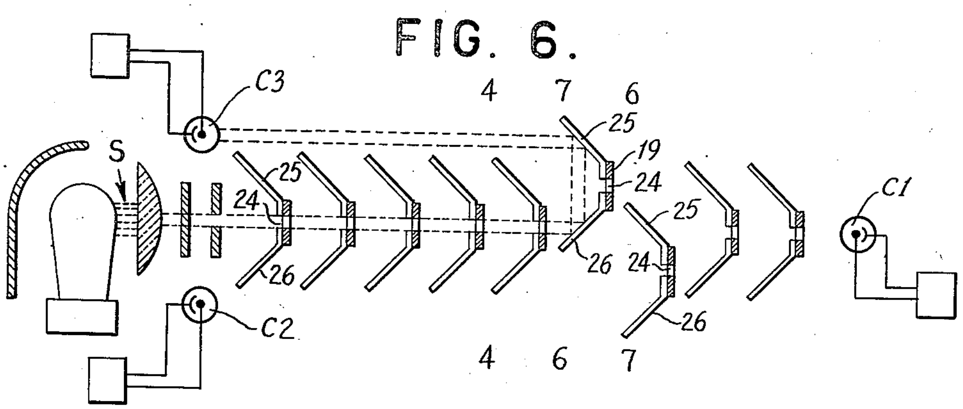

A clockwise movement of one of the operating arms 19 (as in Fig. 3) places reflector 26 in the path of the light ray which is reflected to reflector 25 and then back to a photo-electric cell C3 as illustrated in Fig. 6. The photo-electric cells in turn provide impulses to actuate relays or cause any desired result in the operation of the collator.

In this invention the comparing elements are arranged so that the highest denominational order is nearest the source of light S and the next highest orders follow in succession. For purposes of explanation let us assume that certain columns of a secondary card are punched to represent the number 467 while the same columns of the primary card are punched 467. The small numbers in Fig. 4 on each side the diagrammatic representation of operating arm 19 indicate the denominational orders in which the numbers are being compared. Since the two numbers are equal in each order each control arm 17 will remain in equal position leaving each operating arm 19 in a neutral position and the openings 24 of all orders in alignment thereby allowing light from source S to pass through each opening to energize photo-electric cell C1.

Referring now to Fig. 5, let us suppose that certain columns of a secondary card are punched 467 while the same columns of the primary card are punched 476. Since the two numbers are equal in the highest order the control arm 17 for this order will remain in equal position. The arm 17 for the second order will move clockwise since the secondary card is lower than the primary card causing operating arm 19 to be displaced counterclockwise thereby placing reflector 25 in the path of the light beam. Reflector 25 reflects the beam to reflector 26 which in turn reflects it to a photo-electric cell C2. The beam of light is thus cut off from all orders lower than the second. It should be noted that there is an inequality in the lowest order resulting in a shift of its operating arm 19 to place reflector 26 in the intended path of the light beam. However, the light has been cut off by an inequality in a higher order leaving reflector 26 ineffective.

Referring now to Fig. 6, assume that certain columns of a secondary card are punched 476 while the same columns of the primary card are punched 467. Since the two numbers are equal in the highest order the control arm 17 for this order will remain in equal position. In the second order the primary card is lower than the secondary card which causes the arm 17 for this order to move counterclockwise and displace operating arm 19 clockwise thereby placing reflector 26 in the path of the light beam. Reflector 26 reflects the beam to reflector 25 which in turn reflects it to a photo-electric cell C3. An inequality appears in the lowest order resulting in a shift of its operating arm 19. However, the beam of light has been cut off from this order by a shift of operating arm 19 of the second order thereby rendering the lowest order ineffective.

The main point of the foregoing description is that the highest order in which there is a difference in values of the holes in corresponding columns of two cards being compared predominates over lower orders of the comparing unit.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a comparing device having two sets of denominationally ordered elements settable to represent two amounts, a positionable comparison member in each order controlled by the related elements of such orders to take any one of three positions in accordance with the three possible comparison conditions existing between the digital settings in the related order, the combination therewith of a source of light, a trio of light responsive devices, a light reflector for each of said comparison members and means controlled by the members for positioning their related reflectors intermediate said source and said devices to direct light to a different device for each of the three conditions of comparison.

2. In a comparing device having two sets of denominationally ordered elements settable to represent two amounts, a positionable comparison member in each order controlled by the related elements of such orders to take any one of three positions according to whether one of a set of compared records is higher, lower or equal to another compared record, the combination therewith of a source of light emitting a light beam, a trio of light responsive devices, a light reflector for each of said comparison members, means controlled by the members for positioning their related reflectors in the path of said beam to direct light to a different device for each of two conditions of inequality and an opening in each of said means to allow light from said beam to pass through to another device for a condition of equality.

3. In a comparing device having two sets of denominationally ordered elements settable to represent two amounts, a positionable comparison member in each order controlled by the related elements of such orders to take any one of three positions according to whether one of a set of compared records is higher, lower or equal to another compared record, the combination therewith of a source of light emitting a light beam, a trio of light responsive devices, a pair of light reflectors for each of said comparison members, means controlled by the members for positioning one of their related reflectors in the path of the light beam, said pair of reflectors being in such angular adjustment with one another to enable the light intercepting reflector to deflect the light to the non-intersecting reflector from whence it is directed to a different device for each of two conditions of inequality, and an opening in each of said means to allow light from the source to pass through each opening to another light responsive device for a condition of equality.

4. In a comparing device having two sets of denominationally ordered elements settable to represent two amounts, a positionable comparison member in each order controlled by the related elements of such orders to take any one of three positions according to whether one of a set of compared records is higher, lower or equal to another compared record, the combination therewith of a series of operating arms, one for each order and controlled by the settable elements, an opening in the lower portion of each operating arm, said openings being aligned for an equal setting on said settable elements, a source of light positioned in front of the operating arm of the highest denominational order, a trio of light responsive devices, a beam of light emitting from said source and passing through each aligned opening to one of said devices, and a pair of light reflectors fastened to each operating arm adjacent to said opening, an unequal setting on the settable elements of any order causing a lateral shift of the cooperating operating arm resulting in a reflector of the highest shifted order intercepting the light beam to direct it to a different device for each of two unequal settings, thereby preventing the light from reaching any lower order.

5. The mechanism of claim 4, two of said trio of devices having a position in front of the operating arm of the highest denominational order, one on each side of said beam, thereby enabling reflected light from any order to reach a light responsive device.

MARION R. DILLING.

REFERENCES CITED

The following references are of record in the file of this patent:

UNITED STATES PATENTS

| Number | Name | Date |
|---|---|---|
| 2,408,754 | Bush | Oct. 8, 1946 |